United States Patent
Carrico

(10) Patent No.: US 6,726,237 B1
(45) Date of Patent: Apr. 27, 2004

(54) VERTICALLY OPERABLE HITCH

(76) Inventor: Timothy J. Carrico, 6852 Dodge St., Omaha, NE (US) 68132

( * ) Notice: Subject to any disclaimer, the term of this patent is extended or adjusted under 35 U.S.C. 154(b) by 0 days.

(21) Appl. No.: 10/191,249

(22) Filed: Jul. 8, 2002

Related U.S. Application Data

(60) Provisional application No. 60/304,352, filed on Jul. 10, 2001.

(51) Int. Cl.$^7$ .................................................. B60D 1/06
(52) U.S. Cl. ..................... 280/490.1; 280/482; 414/462
(58) Field of Search .............................. 280/490.1, 482, 280/468, 405.1, 469, 407; 414/282, 283, 462

(56) References Cited

U.S. PATENT DOCUMENTS

| | | | | |
|---|---|---|---|---|
| 3,554,578 A | * | 1/1971 | Reed | 280/490.1 |
| 3,865,406 A | * | 2/1975 | Dutton | 280/490.1 |
| 4,000,911 A | * | 1/1977 | Weber | 280/468 |
| 4,047,630 A | * | 9/1977 | Young | 414/484 |
| 4,148,498 A | * | 4/1979 | Taylor, Jr. | 280/482 |
| 4,662,647 A | * | 5/1987 | Calvert | 280/490.1 |
| 5,421,555 A | * | 6/1995 | Sims | 254/420 |
| 5,511,813 A | * | 4/1996 | Kravitz | 280/495 |
| 5,779,255 A | * | 7/1998 | Garcia, Jr. | 280/404 |
| 5,975,553 A | * | 11/1999 | Van Vleet | 280/483 |
| 5,984,613 A | * | 11/1999 | Motilewa | 414/462 |
| 6,253,980 B1 | * | 7/2001 | Murakami et al. | 224/510 |
| 6,524,054 B2 | * | 2/2003 | Maney | 414/462 |
| 6,585,280 B1 | * | 7/2003 | Wiers | 280/468 |

FOREIGN PATENT DOCUMENTS

DE   3639183 A1 * 8/1987   ............ B06D/1/02

* cited by examiner

*Primary Examiner*—Lesley D. Morris
*Assistant Examiner*—Daniel Yeagley

(57) ABSTRACT

A vertically operable hitch includes a horizontal support member with the forward end journaled in the receiver of a tow vehicle. An upright post on the support member has a carrier operably mounted thereon for selective vertical movement along the post. A hitch ball is mounted on the carrier for selective connection to the tongue of a towed trailer to thereby selectively raise and lower the hitch ball.

5 Claims, 3 Drawing Sheets

US 6,726,237 B1

VERTICALLY OPERABLE HITCH

CROSS-REFERENCES TO RELATED APPLICATIONS

Priority is claimed based upon Provisional Application Serial No. 60/304,352, entitled "Vertically Operable Hitch", filed Jul. 10, 2001.

STATEMENT AS TO RIGHTS TO INVENTIONS MADE UNDER FEDERALLY SPONSORED RESEARCH AND DEVELOPMENT (Not applicable)

BACKGROUND OF THE INVENTION (1) Field of the Invention

The present invention relates generally to hitches for the towing of trailers, and more particularly to an improved hitch with a hitch ball that may be raised and lowered on a vertical axis to tilt a towed trailer.

(2) Background Information

Trailers used for the transport of equipment such as lawnmowers and the like typically require the user to attach a ramp to the rearward end of the trailer in order to load and unload the equipment. While this is not necessarily a huge endeavor there are several drawbacks to such a procedure.

First, the ramp is typically a pair of runways that will receive the opposing sets of wheels of a tractor or similar vehicle. Arranging the runways to align with the wheels of the vehicle requires perfect alignment, so that the tractor will not fall off the runways during the loading or unloading operation.

Other types of trailers have the ramp pivotally connected to the rearward edge of the trailer, and then the ramp is pivoted to an upright position while the trailer is towed. While this overcomes many of the problems associated with the separate and independent runways, it still requires the user to slowly lower a relatively heavy and ungainly ramp from a vertical position to a lowered position, and vice versa. The ramp can be of such weight that this becomes a two-person job, and also requires the user to bend over to raise or lower the ramp, which can lead to back problems.

Yet other trailers are provided with a tiltable bed, pivotally attached to a wheeled frame. Such a trailer permits the user to tilt the trailer bed until the rearward edge is close to the ground, to thereby permit loading and unloading. While this solution eliminates the use of ramps, the weight of the trailer bed and the equipment on the bed, can cause the trailer to tilt quickly and hit the ground, if not carefully controlled. Such control typically requires great strength of the user, unless the load is distributed very carefully on the trailer bed. In addition, the trailer requires a specially built frame, which requires more maintenance, as well as adding significant cost to the manufacture of the trailer.

BRIEF SUMMARY OF THE INVENTION

It is therefore a general object of the present invention to provide an improved hitch for towed trailers, which is vertically operable to raise and lower the hitch ball.

Another is to provide an improved hitch that allows the user to selectively tilt a towed trailer, and lock the trailer in the tilted position.

Still another object of the present invention is to provide a vertically operable hitch that may be used on conventional trailers of many types, without modification to the trailer.

These and other objects will be apparent to those skilled in the art.

The vertically operable hitch of the present invention includes a horizontal support member with the forward end journaled in the receiver of a tow vehicle. An upright post on the support member has a carrier assembly operably mounted thereon for selective vertical movement along the post. A hitch ball is mounted on the carrier assembly for selective connection to the tongue of a towed trailer to thereby selectively raise and lower the hitch ball.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
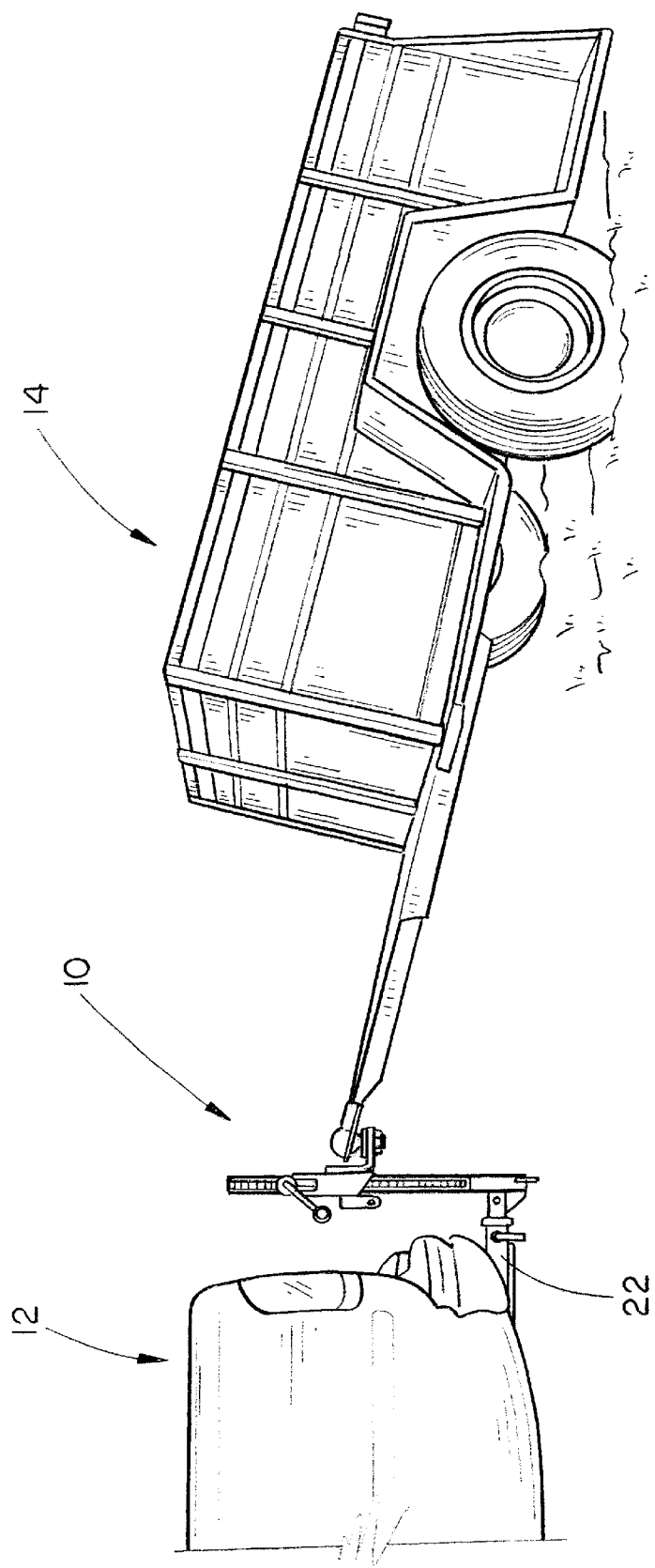
FIG. 1 is a pictorial view of the hitch of the present invention installed on a vehicle with a trailer connected thereto, with the hitch in the raised position.

Referring now to the drawings, in which similar or corresponding parts are identified with the same reference numeral, and more particularly to FIG. 1, the hitch of the present invention is designated generally at 10, and is shown mounted on a vehicle 12 with a trailer 14 operably connected thereto. The hitch 10 is shown in the raised position in FIG. 1, to tilt trailer 14 for loading and unloading.

Figure 2:
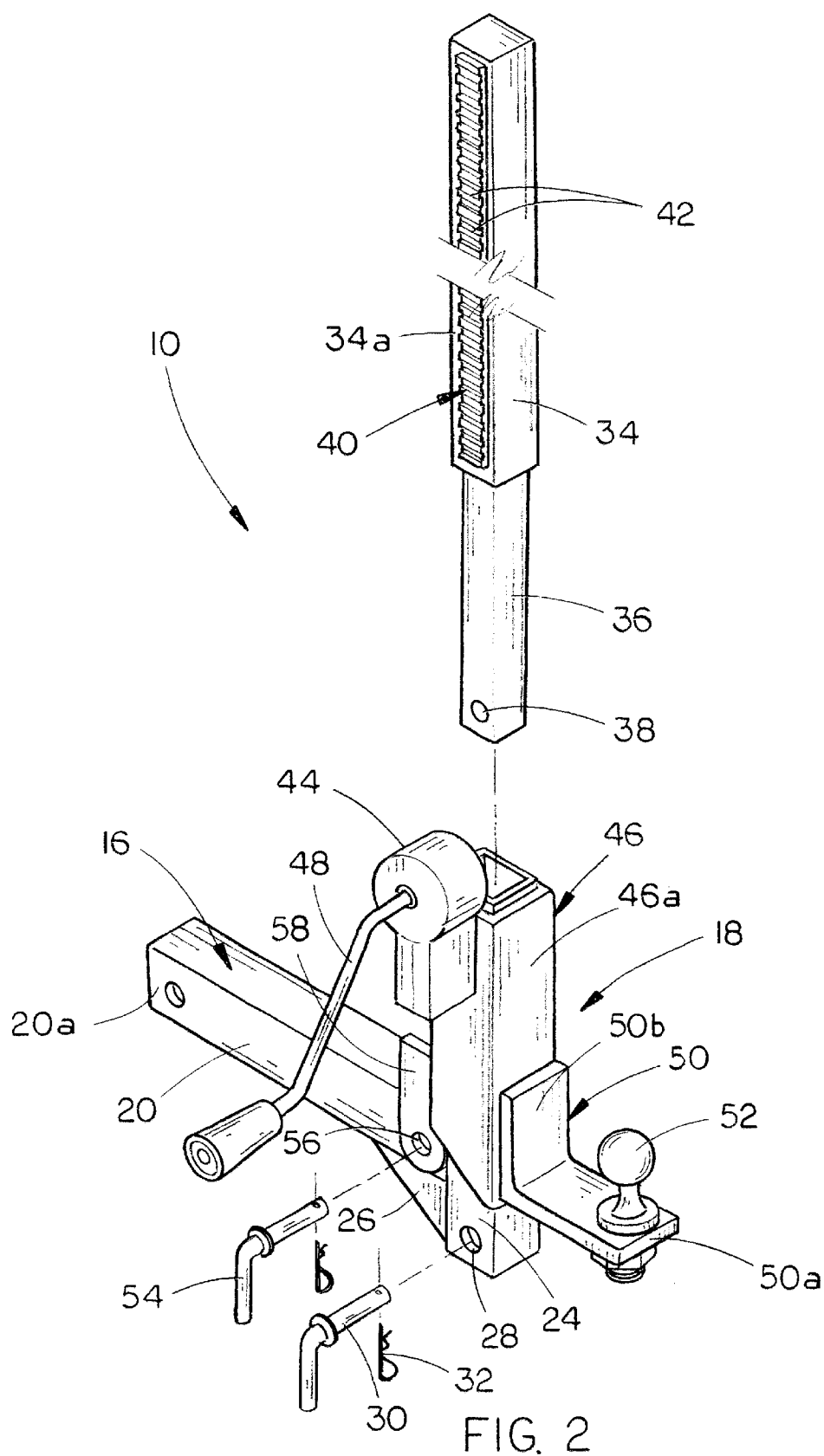
FIG. 2 is an enlarged exploded perspective view of the hitch.
Figure 3:
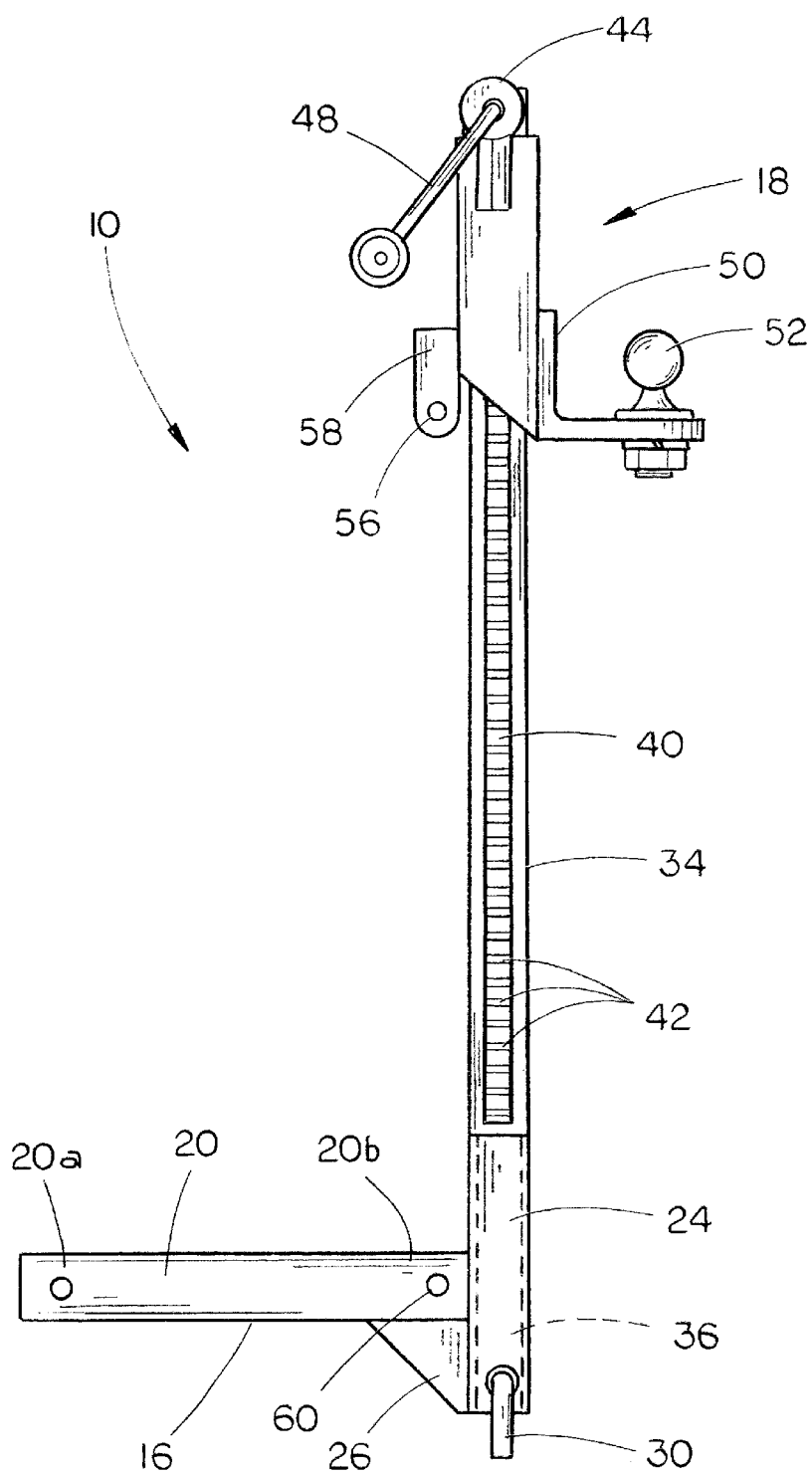
FIG. 3 is a side elevational view of the hitch, with the carrier assembly in the raised position.

Referring now to FIGS. 2 and 3, hitch 10 includes a stationery support frame 16 and an operable carrier assembly 18. As shown throughout the drawings, carrier 18 is mounted for selective vertical movement on support frame 16, to thereby tilt trailer 14 (shown in FIG. 1) connected to hitch 10.

Support frame 16 includes a horizontal tube 20 having a forward end 20a designed for selective journaled mounting within the receiver of a conventional receiver 22 (shown in FIG. 1) on the tow vehicle 12. A vertically oriented support post 24 is rigidly mounted at the rearward end 20b of tube 20 and affixed in position by a gusset 26. Support post 24 is a hollow tubular member with a pair of aligned apertures 28 at the lower end for selectively receiving a lock pin 30 therethrough. Lock pin 30 is releasably secured by cotter pin 32 in a conventional fashion.

An elongated guidepost 34 includes a leg 36 extending coaxially and downwardly therefrom having dimensions to slide within support post 24. An aperture 38 extending horizontally through leg 36 will align with apertures 28 when leg 36 is journaled within support post 24, to permit securement by pin 30. Guidepost 34 preferably has the same outer dimensions as support post 24, and rests on the upper edge thereof when secured in position.

A toothed rack 40 is mounted along one face 34a of guidepost 34 with a plurality of teeth 42 that will be engaged by a gear (not shown) of a gear box 44 on carrier 18. Rack 40 extends the entire vertical length of guidepost 34, to permit movement of carrier 18 along the entire height of guidepost 34.

Carrier 18 includes a vertically oriented sleeve 46 slidably mounted over guidepost 34 and support post 24, for vertical movement therealong. Gearbox 44 is affixed to the upper end of sleeve 46 and includes a series of intermeshed gears, with a drive gear (not shown) within the gearbox engaged on teeth 42 of rack 40 in a conventional fashion. A handle 48 is operably connected to the gears within gearbox 44 to drive the gears and thereby raise and lower gearbox 44 and carrier 18 along rack 40 on guidepost 34.

A rigid bracket 50 having a horizontal leg 50*a* and a vertical leg 50*b* is mounted to the rearward face 46*a* of sleeve 46, with the horizontal leg 50*a* projecting rearwardly from sleeve 46. A conventional hitch ball 52 is mounted on the upper face of horizontal leg 50*a*, to selectively receive the hitch housing of a conventional trailer hitch on trailer 14. Thus, hitch ball 52 will travel vertically with the vertical movement of carrier 18 as handle 48 is operated to engage the gears of gearbox 44 with rack 40.

In order to retain the carrier assembly 18 in the lower towing position, and thereby reduce wear on the teeth 42 of rack 40, a pin 54 is selectively journaled though aligned apertures 56 in the legs of a clevis 58 on sleeve 46 and apertures 60 formed through the rearward end of horizontal tube 20. Although not shown in the drawings, a lock or brake may be provided to maintain the carrier assembly 18 in the desired position along guidepost 34.

Whereas the invention has been shown and described in connection with the preferred embodiments thereof, many modifications, substitutions and additions may be made which are within the intended broad scope of the appended claims.

What is claimed is:

1. A vertically operable hitch, comprising:

an elongated square tube having forward and rearward ends, the forward end adapted for slidable removable connection to a receiver hitch of a tow vehicle;

vertically-oriented support tube mounted on the rearward end of said square tube;

a post removably connected to an upper end of the support tube and projecting vertically therefrom;

a carrier operably mounted for selective vertical movement along the post and on to the support tube;

said carrier operably mounted for complete support on the support tube when the post is removed from the support tube;

a hitch ball mounted on the carrier for movement therewith; and means for selectively operating the carrier along the support tube and post to thereby selectively raise and lower the hitch ball.

2. The hitch of claim 1, wherein said means for selectively operating the carrier includes:

a rack of teeth on the post;

a gearbox on the carrier with a gear engaging the teeth to raise and lower the gearbox along the post; and means connected to the gearbox to selectively operate the gear to raise and lower the gearbox.

3. The hitch of claim 2, wherein said means for selectively operating the gear includes a manually operable handle connected to the gearbox.

4. The hitch of claim 2, wherein said post includes a depending coaxial leg slidably journaled within the support tube.

5. The hitch of claim 4, further comprising removable fastener means for selectively preventing removal of the post depending leg from the support tube.4

* * * * *